US007179523B2

(12) United States Patent
Lai et al.

(10) Patent No.: US 7,179,523 B2
(45) Date of Patent: Feb. 20, 2007

(54) IMAGING ELEMENT HAVING IMPROVED CRACK PROPAGATION DURING CONVERSION

(75) Inventors: Yeh-Hung Lai, Webster, NY (US); Suresh Sunderrajan, Rochester, NY (US); Thaddeus S. Gula, Rochester, NY (US); William A. Mruk, Rochester, NY (US); Narasimharao Dontula, Rochester, NY (US); Gary D. Smith, Rochester, NY (US); YuanQiao Rao, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 357 days.

(21) Appl. No.: 10/033,496

(22) Filed: Dec. 28, 2001

(65) Prior Publication Data

US 2003/0129376 A1 Jul. 10, 2003

(51) Int. Cl.

*B32B 3/26* (2006.01)
*B32B 5/24* (2006.01)
*B32B 3/00* (2006.01)
*B32B 5/20* (2006.01)

(52) U.S. Cl. .............................. 428/304.4; 428/311.11; 428/314.4; 428/315.7; 428/318.8

(58) Field of Classification Search ............. 428/304.4, 428/314.4, 311.11, 318.8, 315.7
See application file for complete search history.

(56) References Cited

U.S. PATENT DOCUMENTS 4,832,775 A 5/1989 Park et al.
5,665,514 A * 9/1997 Shirai et al. ................ 430/201
5,851,651 A 12/1998 Chao
5,866,282 A 2/1999 Bourdelais et al.
6,030,742 A * 2/2000 Bourdelais et al. ......... 430/201
6,447,976 B1 * 9/2002 Dontula et al. ............. 430/201
6,537,656 B1 * 3/2003 Dontula et al. .......... 428/314.4

FOREIGN PATENT DOCUMENTS

JP 10052978 A * 2/1998

OTHER PUBLICATIONS

Computer translation of JP 10-052978 A (see above for inventor and date).*
Japanese Abstract 2839905.
Japanese Abstract 09106038.
U.S. Appl. No. 09/723,518, filed Nov. 28, 2000, Dontula et al.

* cited by examiner

*Primary Examiner*—Terrel Morris
*Assistant Examiner*—Victor Chang
(74) *Attorney, Agent, or Firm*—Paul A Leipold

(57) ABSTRACT

The invention relates to an imaging member comprising an imaging layer and a base wherein said base comprises a closed cell foam core sheet and adhered thereto an upper and lower flange sheet, wherein said foam core sheet has a modulus of between 100 and 2758 MPa and a tensile toughness between 0.344 and 35 MPa, and wherein said upper and lower flange sheet has a modulus of between and 1380 and 20000 MPa and a toughness between 1.4 and 210 MPa.

11 Claims, 3 Drawing Sheets

IMAGING ELEMENT HAVING IMPROVED CRACK PROPAGATION DURING CONVERSION

CROSS-REFERENCE RELATED APPLICATIONS

The present application claims priority under 35 U.S.C. § 119(e) to: provisional patent application 60/622,054, filed 27 Oct. 2004; provisional patent application 60/605,157, filed 30 Aug. 2004; and provisional patent application 60/535,549, filed 12 Jan. 2004.

FIELD OF THE INVENTION

This invention relates to an imaging element. In a preferred form, the invention relates to supports for photographic, inkjet, thermal and electrophotographic media. More specifically, this invention relates to a composite imaging element with a polymer foam layer, which provides improved crack propagation during the conversion process.

BACKGROUND OF THE INVENTION

In order for a hard-copy imaging support to be widely accepted by the consumer for imaging applications, it has to meet several requirements. Consumer preference for 'imaging media', as documented in 'voice-of-customer' surveys, typically constrains certain fundamental imaging support properties, such as basis weight, caliper, stiffness, smoothness, and gloss, within a narrow range. Supports with properties outside the typical range for 'imaging media' suffer low consumer acceptance.

In addition to these fundamental requirements, imaging supports are also subject to other specific requirements depending upon the mode of image transfer onto the support. For example, in the formation of photographic paper, it is important that the photographic paper be resistant to penetration by liquid processing chemicals failing which there is present a stain on the print border accompanied by a severe loss in image quality. In the formation of 'photo-quality' inkjet paper, it is important that the paper is readily wetted and that it exhibit the ability to absorb high concentrations of ink and dry quickly, failing which elements block together when stacked against subsequent prints and exhibit smudging and uneven print density. For thermal media, it is important that the support contains an insulative layer in order to maximize the transfer of dye from the donor that results in higher color saturation.

It is important therefore, for an imaging media, to simultaneously satisfy several requirements. One commonly used technique in the art for simultaneously satisfying multiple requirements is through the use of composite structures comprising multiple layers wherein each of the layers, either individually or synergistically, serve distinct functions. For example, it is known that a photographic paper comprises a cellulose paper base that has applied thereto a layer of polyolefin resin, typically polyethylene, on each side, which serves to provide waterproofing to the paper and also provides a smooth surface on which the photosensitive layers are formed. For example also, in U.S. Pat. No. 5,866,282, biaxially oriented polyolefin sheets are extrusion laminated to cellulose paper to create a support for silver halide imaging layers. The biaxially oriented sheets described therein have a microvoided layer in combination with coextruded layers that contain white pigments such as $TiO_2$ above and below the microvoided layer. The composite imaging support structure described has been found to be more durable, sharper and brighter than prior art photographic paper imaging supports that use cast melt extruded polyethylene layers coated on cellulose paper. For example also, in U.S. Pat. No. 5,851,651, porous coatings comprising inorganic pigments and anionic, organic binders are blade coated to cellulose paper to create 'photo-quality' inkjet paper.

The composite imaging element, such as described above, is typically formed in long, wide sheets and then spooled into large rolls. These large wide rolls must then be converted into predetermined smaller sizes by slitting, chopping, and/or perforating the large wide rolls. It is important that the various conversion operations, also referred to as cutting processes, be performed without damaging the imaging element. It is also important that the conversion be performed without creating substantial amounts of dust or hair-like debris which might lead to undesirable contamination of imaging surfaces.

The generation of this hair-like debris is generally attributed to an adverse combination of stiffness and toughness of the various layers of the imaging element. A poor combination of stiffness and toughness properties of various layers results in uncontrolled crack propagation during cutting and the subsequent formation of hair-like debris. Poor layer material selection and/or layer ordering results in poor cutting performance. For example, there is a problem with the element described in U.S. Pat. No. 5,866,282 in that the cutting of this imaging element results in the creation of substantial amounts of hair-like debris which is highly undesirable. The poor cutting performance may be traced to the poor material selection and ordering in the composite, resulting in an adverse combination of stiffness and toughness of the various layers of the imaging element and uncontrolled crack propagation during cutting.

Polymer foams have previously found significant application in food and drink containers, packaging, furniture, appliances, etc. They are also referred to as cellular polymers, foamed plastic or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to said major surface of the polystyrene foam substrate. The foregoing composite foam/film structure can be shaped by conventional processes as thermoforming to provide numerous types of useful articles including cups, bowls, and plates, as well as cartons and containers that exhibit excellent levels of puncture, flex-crack, grease and abrasion resistance, moisture barrier properties and resiliency. Foams have also found limited application in imaging media. For example, JP-2839905 B2 discloses a 3 layer structure comprising a foamed polyolefin layer on the image-receiving side, raw paper base and a polyethylene resin coat on the backside. Another variation is a 4 layer structure highlighted in JP-09106038 A. In this, the image receiving resin layer comprises of 2 layers, an unfoamed resin layer which is in contact with the emulsion, and a foamed resin layer which is adhered to the paper base.

U.S. patent application Ser. No. 09/723,518, filed Nov. 28, 2000, discloses an imaging element comprising an imaging layer and a base wherein said base comprises a closed cell foam core sheet and adhered thereto an upper and lower flange sheet, and wherein said imaging member has a stiffness of between 50 and 250 milliNewtons. Although this imaging element is suitable for imaging applications, an adverse material selection for each of the elemental layers can, during conversion, result in uncontrolled cracks which tend to branch into the core/flange interface and, subsequently, tear the flange layer at a location away from the moving knife thus, creating hair-like debris which hangs onto the cut edge. This debris may then fall onto the imaging surface during subsequent handling of the imaging element.

PROBLEM TO BE SOLVED BY THE INVENTION

There is a need for a composite photographic base that has high stiffness, excellent smoothness, high opacity, excellent humidity curl resistance, that can be manufactured using a single in-line operation, that can be effectively recycled and that can be slit, chopped, or perforated with fewer cutting defects.

SUMMARY OF THE INVENTION

It is an object of the invention to provide a composite imaging element that generates less cutting defects during the cutting process.

This is accomplished by an imaging member comprising an imaging layer and a base wherein said base comprises a closed cell foam core sheet and adhered thereto an upper and lower flange sheet, wherein said foam core sheet has a modulus of between 100 and 2758 MPa and a tensile toughness between 0.344 and 35 MPa, and wherein said upper and lower flange sheets have a modulus of between and 1380 and 20000 MPa and a toughness between 1.4 and 210 MPa.

ADVANTAGEOUS EFFECT OF THE INVENTION

The invention provides an imaging material and cutting method that allows the imaging material to be slit or chopped with fewer cutting defects.

DETAILED DESCRIPTION OF THE INVENTION

Figure 1:
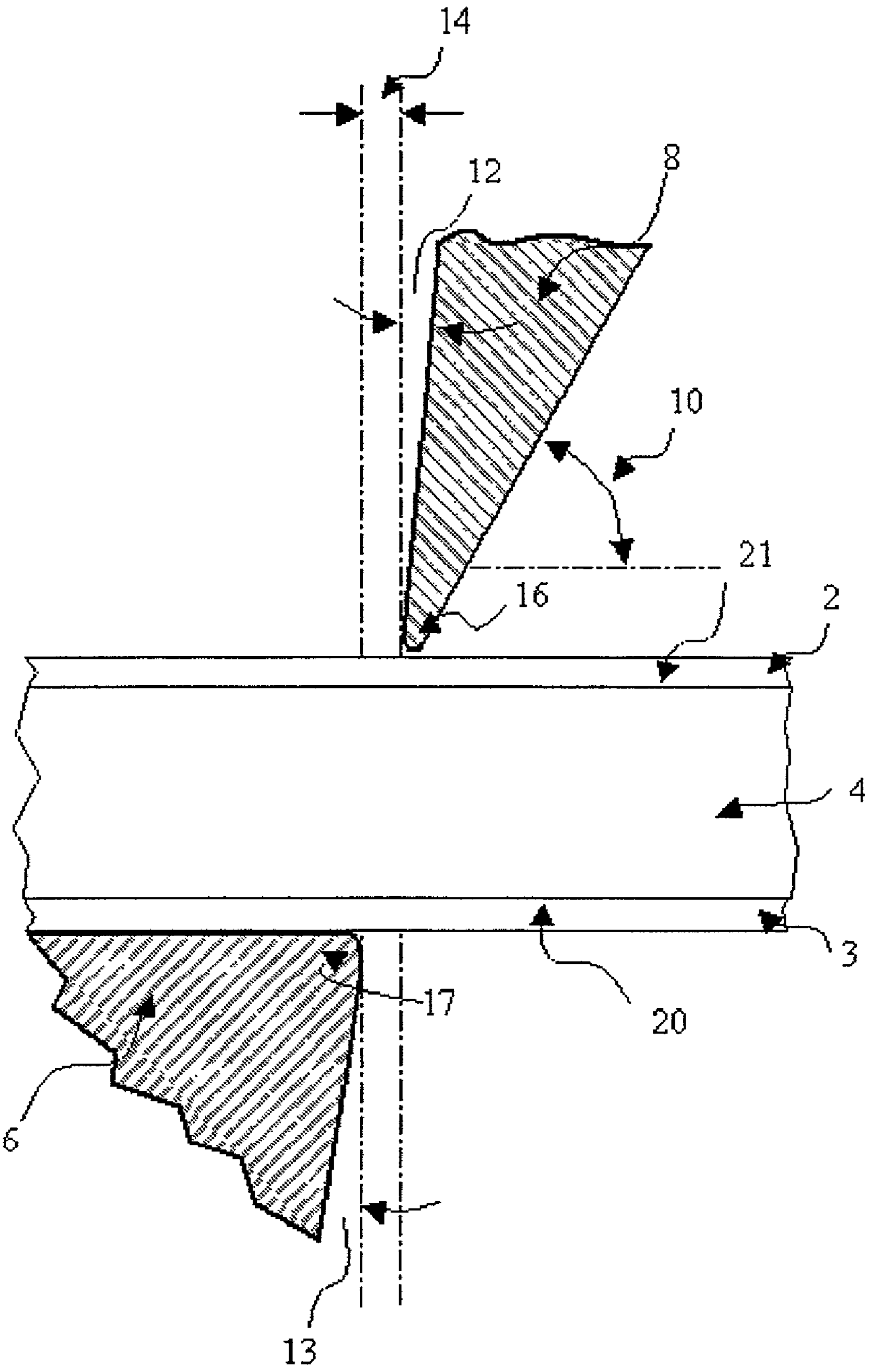
FIG. 1 is a partially sectional view illustrating cutting edge portion of the cutting knives and imaging element.

This invention has numerous advantages. The invention produces an element that has much less tendency to curl when exposed to extremes in humidity. The element can be manufactured in a single in-line operation. This significantly lowers element manufacturing costs and would eliminate disadvantages in the manufacturing of the current generation of imaging supports including very tight moisture specifications in the raw base and specifications to minimize pits during resin coating. The element can also be recycled to recover and reuse polyolefin instead of being discarded into landfills. It is an objective of this invention to use foam at the core of the imaging base, with high modulus flange layers that provide the needed stiffness surrounding the foam core on either side. It is also an objective of this invention to provide a composite imaging element that can be cut without substantial edge defects and cutting debris. These and other advantages will be apparent from the detailed description below.

It is an objective of this invention to select a suitable foam material for use as the core of the imaging element, with high modulus flange layers of suitable materials that provide the needed stiffness surrounding the foam core on either side while simultaneously offering improved cutting performance defined as cuts wherein the crack tip moves at the same velocity as the knife tip and there are no hairy-edges.

Fundamentally, cutting processes are fracture processes. One needs to initiate and propagate a crack through the thickness of the substrate, in this case an imaging element. A clean cut usually requires good control over crack initiation and propagation throughout the cutting process. Typically, in the cutting process, the crack is controlled by a moving knife. If the crack advances ahead of the moving knife, in particular if it accelerates away from the moving knife, it is more difficult to control the cut, i.e. where and how the cutting crack propagates. On the other hand, if crack propagation is controlled by keeping the crack tip near the moving knife tip, i.e. moving at the speed of the moving knife, control over cutting crack propagation is ensured. In turn, cutting edge defects are reduced significantly.

The cutting process is similar to driving a crack through a material using a wedge; accordingly we may use fracture mechanics theory ("*Fracture Mechanics, Fundamentals and Applications*", T. L. Anderson, 1991., "*The Stress Analysis of Crack handbook*", Tada, H., Paris, P. C., and Irwin, G, 2nd Edition, Paris Production Incorporated, 1985.) to guide the selection of core layer materials that produce the desired cutting performance. The distance between the leading edge of the wedge and the crack tip is proportional to the modulus but inversely proportional to the toughness of the cracked body. Since we want to control the crack during cutting so that the crack tip is as close to the knife tip as possible to prevent the crack from "running-away", the ideal material for the core layer is one that has a relatively low modulus and a relatively high toughness. One class of materials that may satisfy this requirement is, as known in the art, 'polymer foams'.

The imaging member of the invention comprises a polymer foam core that has adhered thereto an upper and a lower flange sheet. The polymer foam core comprises a homopolymer such as a polyolefin, polystyrene, polyvinylchloride or other typical thermoplastic polymers; their copolymers or their blends thereof; or other polymeric systems like polyurethanes, polyisocyanurates; that has been expanded through the use of a blowing agent to consist of two phases, a solid polymer matrix and a gaseous phase. Other solid phases may be present in the foams in the form of fillers that are of organic (polymeric, fibrous) or inorganic (glass, ceramic, metal) origin. The fillers may be used for physical, optical, chemical, or processing property enhancements of the foam.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbondioxide by the application of heat or through exothermic heat of reaction during polymerization. Physical methods include such techniques as the expansion of a gas dissolved in a polymer mass upon reduction of system pressure; the volatilization of low-boiling liquids such a fluorocarbons or methylene chloride, or the incorporation of hollow microspheres in a polymer matrix. The choice of foaming technique is dictated by desired foam density reduction, desired properties and manufacturing process.

In a preferred embodiment of this invention polyolefins such as polyethylene and polypropylene, their blends and their copolymers are used as the matrix polymer in the foam core along with a chemical blowing agent such as sodium bicarbonate and its mixture with citric acid, organic acid salts, azodicarbonamide, azobisformamide, azobisisobutyronitrile, diazoaminobenzene, 4,4'-oxybis(benzene sulfonyl hydrazide) (OBSH), N,N'-dinitrosopentamethyltetramine (DNPA), sodium borohydride and other blowing agent agents well known in the art. The preferred chemical blowing agents would be sodium bicarbonate/citric acid mixtures, azodicarbonamide; though others can also be used. If necessary, these foaming agents may be used together with an auxiliary foaming agent, nucleating agent, and a crosslinking agent.

The flange sheets of this invention are chosen to satisfy specific requirements of flexural modulus, caliper, surface roughness, and optical properties such as colorimetry and opacity. Imaging elements are constrained to a range in stiffness and caliper. At stiffness below a certain minimum stiffness, there is a problem with the element in print stackability and print conveyance during transport through photofinishing equipment, particularly high speed photoprocessors. It is believed that there is a minimum cross-direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important for the same transport reasons through photofinishing equipment that the caliper of the imaging element be constrained between 75 microns and 350 microns.

Imaging elements are typically constrained by consumer preference and by processing machine restrictions to a stiffness range of between approximately 50 mN and 250 mN and a caliper range of between approximately 100 μm and 400 μm. In the design of the element of the invention, there exists a relationship between stiffness of the imaging element and the caliper and modulus of the foam core and modulus of the flange sheets, i.e., for a given core thickness, the stiffness of the element can be altered by changing the caliper of the flange elements and/or changing the modulus of the flange elements and/or changing the modulus of the foam core. Preferred ranges of foam core caliper and modulus and flange caliper and modulus follow—the preferred caliper of the foam core of the invention ranges between 100 μm and 300 μm, the caliper of the flange sheets of the invention ranges between 10 μm and 150 μm, the modulus of the foam core of the invention ranges between 100 MPa and 2758 MPa and the modulus of the flange sheets of the invention ranges from 1380 MPa to 20000 MPa. In each case, the above range is preferred because of (a) consumer preference, (b) manufacturability and cutting performance, and (c) materials selection. It is noted that the final choice of flange and core materials, modulus, and caliper will be a subject of the target overall element stiffness and caliper.

Modulus and tensile toughness can be determined using a tensile test such as that described in ASTM D638. A tensile test consists of slowly pulling a sample of material with a tensile load until it breaks. The test sample used may have a circular or a rectangular cross section. From the load and elongation history, a stress-strain curve is obtained with the strain being plotted on the x-axis and stress on the y-axis. The modulus is defined as the slope of the initial linear portion of the stress-strain curve. The modulus is a measure of a material's stiffness. The tensile toughness is defined as the area under the entire stress-strain curve up to the fracture point. The tensile toughness is a measure of the ability of a material to absorb energy. Both modulus and tensile toughness are fundamental mechanical properties of material.

The foam core sheet in this article has a preferred modulus of between 100 and 2758 MPa and a preferred tensile toughness between 0.344 and 35 MPa. The upper and lower flange sheet has a preferred modulus of between and 1380 and 20000 MPa and a preferred toughness between 1.4 and 210 MPa.

The materials of choice for the flange sheets include raw paperbase, polyolefins, polystyrene, oriented polyolefins, oriented polystyrene, filled polyolefins, filled polystyrene, etc.

In a preferred embodiment of this invention, the flange sheets used comprise paper. The paper of this invention can be made on a standard continuous Fourdrinier wire machine or on other modern paper formers. Any pulps known in the art to provide paper may be used in this invention. Bleached hardwood chemical kraft pulp is preferred as it provides brightness, a good starting surface, and good formation while maintaining strength. Paper flange sheets useful to this invention are of caliper between about 25 microns and about 100 microns, preferably between about 30 microns and about 70 microns. They must be "smooth" as to not interfere with the viewing of images. Chemical additives to impart hydrophobicity (sizing), wet strength, and dry strength may be used as needed. Inorganic filler materials may be used to enhance optical properties and reduce cost as needed. Dyes, biocides, processing chemicals etc. may also be used as needed. The paper may also be subject to smoothing operations such as dry or wet calendering as well as to coating through an in-line or an off-line paper coater.

In another preferred embodiment of this invention, the flange sheets used comprise high modulus polymers such as high density polyethylene, polypropylene, or polystyrene; their blends or their copolymers; that have been stretched and oriented or been filled with suitable filler materials as to increase the modulus of the polymer and enhance other properties. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, carbon black, and the like. Some of the organic fillers used are wood flour, jute fibers, sisal fibers, polyester fibers and the like. The preferred fillers are talc, mica, and calcium carbonate. Polymer flange sheets useful to this invention are of caliper between about 10 microns and about 150 microns, preferably between about 35 microns and about 70 microns.

In another preferred embodiment of this invention, the flange sheets used comprise paper on one side and a high modulus polymeric material on the other side.

The caliper of the paper and of the high modulus polymeric material is determined by the respective flexural modulus such that the overall stiffness of the imaging element lies within the preferred range and the bending moment around the central axis is balanced to prevent excessive curl.

In addition to the stiffness and caliper, an imaging element needs to meet constraints in surface smoothness and optical properties such as opacity and colorimetry. Surface smoothness characteristics may be met during flange-sheet manufacturing operations such as during papermaking or during the manufacture of oriented polymers like oriented polystyrene. Alternatively, it may be met by extrusion coating additional layer(s) of polymers such as polyethylene onto the flange sheets in contact with a textured chill-roll or similar technique by those skilled in the art. Optical properties such as opacity and colorimetry may be met by the appropriate use of filler materials such as titanium dioxide and calcium carbonate and colorants, dyes and/or optical brighteners or other additives known to those skilled in the art. Any suitable white pigment may be incorporated in the polyolefin layer, such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the polyolefin. The preferred pigment is titanium dioxide. Any suitable optical brightener may be employed in the polyolefin layer including those described in Research Disclosure Issue No. 308, December 1989, Publication 308119, Paragraph V, Page 998 (incorporated wholly herein by reference).

In addition, it may be necessary to use various additives such as antioxidants, slip agents, or lubricants, and light stabilizers to the plastic elements as well as biocides to the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly {[6-[(1,1,3,3-tetramethylbutylamino}-1,3,5-triazine-4-piperidinyl)-imino]-1, 6-hexanediyl[{2,2,6,6-tetramethyl-4-piperdinyl) imino]} (Chimassorb 944LD/FL).

Used herein, the phrase, ‘imaging element’, comprises an imaging support as described above along with an image receiving layer as applicable to multiple techniques governing the transfer of an image onto the imaging element. Such techniques include thermal dye transfer, electrophotographic printing, or ink jet printing as well as a support for photographic silver halide images. As used herein, the phrase “imaging element” is a material that utilizes photosensitive silver halide in the formation of images.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from about 1 to about 10 g/m$^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. In one form, the electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

When used as inkjet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer of the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, and the like; derivatives of natural polymers such as functionalized proteins, functionalized gums and starches, and cellulose ethers and their derivatives; and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers; and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is sufficient for the base layer to be hydrophilic, but not porous. This is especially true for photographic quality prints, in which porosity may cause a loss in gloss. Optionally, rigidity may be imparted to the base layer through incorporation of a second phase such as polyesters, poly (methacrylates), polyvinyl benzene-containing copolymers, and the like. In particular, the ink receiving layer may consist of any hydrophilic polymer or combination of polymers with or without additives as is well known in the art.

If desired, the ink receiving layer can be overcoated with an ink-permeable, anti-tack protective layer, such as, for example, a layer comprising a cellulose derivative or a cationically-modified cellulose derivative or mixtures thereof. An especially preferred overcoat is poly b-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of about 0.1 to about 5 mm, preferably about 0.25 to about 3 mm.

In practice, various additives may be employed in the ink receiving layer and overcoat. These additives include surface active agents surfactant(s) to improve coatability and to adjust the surface tension of the dried coating, acid or base to control the pH, antistatic agents, suspending agents, antioxidants, hardening agents to cross-link the coating, antioxidants, stabilizers, light stabilizers, and the like. In addition, a mordant may be added in small quantities (2%–10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, curtain coating, and the like. Some of these methods allow for simultaneous coatings of both layers, which is preferred from a manufacturing economic perspective.

The DRL (dye receiving layer) is coated over the tie layer or TL at a thickness ranging from 0.1–10 mm, preferably 0.5–5 mm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166, and Japanese Patents 1,095,091; 2,276,671; 2,276,670; 4,267,180; 5,024,335; and 5,016,517 discloses aqueous based DRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based IRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque paper bases are useful in combination with silver halide images because the contrast range of the silver halide image is improved and show through of ambient light during image viewing is reduced. The imaging element of this invention is directed to a silver halide imaging element capable of excellent performance when exposed by either an electronic printing method or a conventional optical printing method. An electronic printing method comprises subjecting a radiation sensitive silver halide emulsion layer of a recording element to actinic radiation of at least 10-4 ergs/cm2 for up to 100 m seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least 10-4ergs/cm2 for 10-3 to 300 seconds in an imagewise mode wherein the silver halide emulsion layer is comprised of silver halide grains as described above.

This invention in a preferred embodiment utilizes a radiation-sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML6]^n \qquad \text{(I)}$$

wherein n is zero, −1, −2, −3, or −4; M is a filled frontier orbital polyvalent metal ion, other than iridium; and L6 represents bridging ligands which can be independently selected, provided that at least four of the ligands are anionic ligands, and at least one of the ligands is a cyano ligand or a ligand more electronegative than a cyano ligand; and (ii) an iridium coordination complex containing a thiazole or substituted thiazole ligand.

This invention is directed towards a photographic recording element comprising a support and at least one light sensitive silver halide emulsion layer comprising silver halide grains as described above.

The following examples illustrate the practice of this invention. They are not intended to be exhaustive of all possible variations of the invention.

EXAMPLES

Examples to evaluate the cutting performance of various imaging element samples are given in this section. Two techniques are used in the evaluation. The first technique is a computational finite element method. The second technique is an experimental cutting test using a guillotine chopper.

Evaluation Using the Finite Element Method

The cutting process of the image element is simulated by the finite element technique. In accordance with conventional finite element analysis techniques, the first step is to generate a geometric representation of the entire imaging element including all layers and cutting knives. A geometric model of the imaging element is created by dividing all imaging element components into discrete elements (also called mesh). The cutting knives are modeled as rigid surfaces since typical knives are made of material much stiffer than materials for the imaging element. A pair of typical knives is modeled. Practical cutting operations utilize one knife that is moving relative to the other. Knife geometry and the cutting process are depicted in FIG. 1, FIG. 2, and FIG. 3.

FIG. 1 shows a partial sectional view illustrating the cutting edges of the cutting knives and imaging element. The various elements of the cutting knives and imaging element are labeled appropriately and described as follows: 2 and 3 are the flange layers. 4 is the core layer. 6 is the stationary knife. 8 is the moving knife. 10 is the rake angle of the moving knife. 12 is the relief angle of the moving knife. 13 is the relief angle of the stationary knife. 14 is the clearance between moving and stationary knives. 16 is the tip radius of the moving knife. 17 is the tip radius of the stationary knife. 20 is the interface between the core and lower flange layers.

Figure 2:
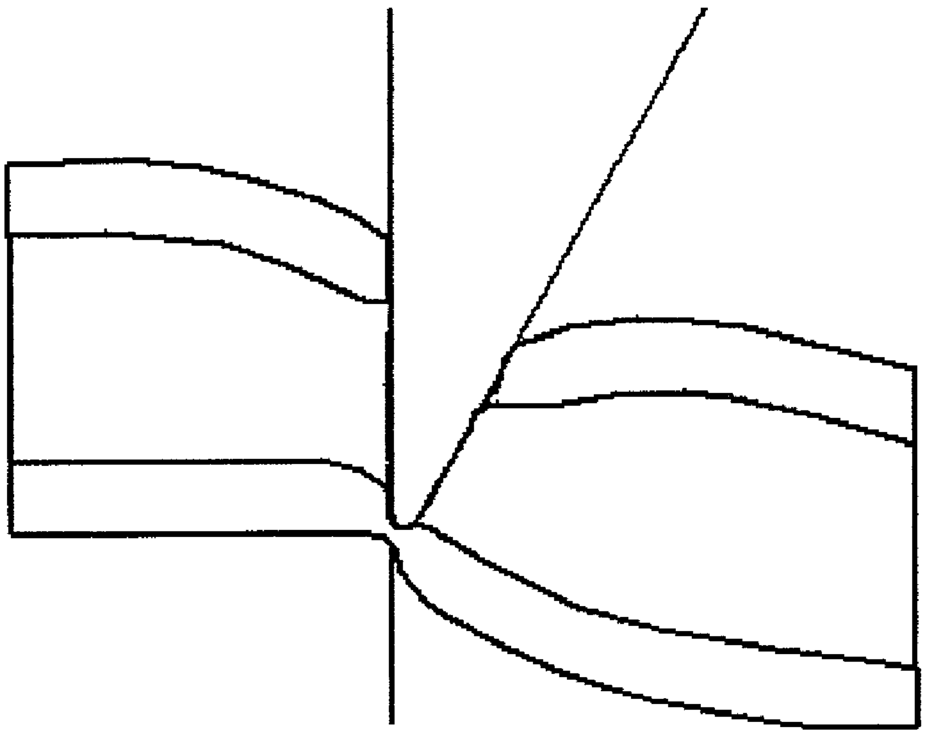
FIG. 2 is a finite element deformation plot illustrating the relative position of the knives and imaging element with an acceptable cutting property.

FIG. 2 is a finite element deformation plot illustrating the relative position of the knives and imaging element with an acceptable cutting property.

Figure 3:
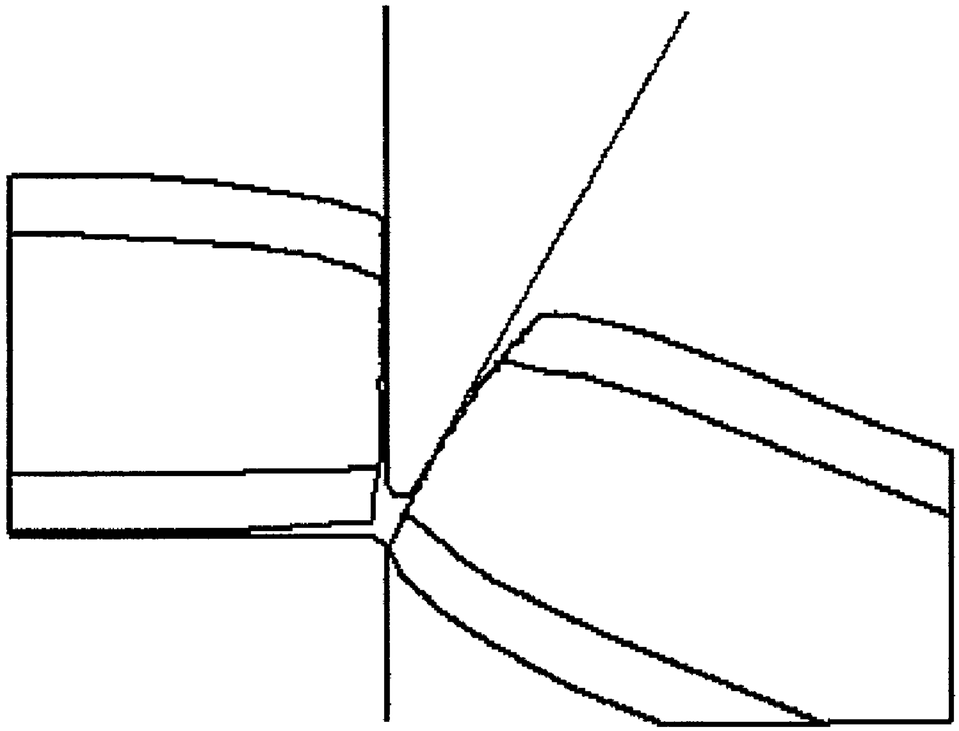
FIG. 3 is a finite element deformation plot illustrating the relative position of the knives and imaging element with an unacceptable cutting property.

FIG. 3 is a finite element deformation plot illustrating the relative position of the knives and imaging element with an unacceptable cutting property.

We model one knife as stationary (stationary knife 6) and the other as moving (moving knife 8). Furthermore, the image material to be cut is usually stationary relative to the moving knife. Therefore, we model the imaging element so that it is placed on top of the stationary knife. In all examples examined in this article, the moving knife has a rake angle 10 of 60 degrees; the stationary knife has a rake angle of zero degree; both have a relief angle 12, 13 of zero degree; the clearance 14 between both knives is zero; tip radii 16, 17 of both knives are 0.0025 mm. These parameters are typically used in cutting operations at manufacturing facilities and at photo finishing labs. Each layer of the imaging element is modeled as an elastic/plastic material with work hardening and a break of elongation value.

As described in the Background of Invention, if the cutting crack advances much farther ahead of the moving knife tip, the cutting crack is more likely to branch into the core/flange interface 20, 21 and subsequently tear the flange layer at an undesired location thus creating hair-like debris. If the knife tip of the moving knife 8 has advanced beyond the interface 20 between the core and the remaining flange layers, the material for the imaging element is considered 'acceptable' as shown in FIG. 2. On the other hand, if the knife tip has not reached the interface 20 when the cutting is complete, the imaging material is considered 'unacceptable' as shown in FIG. 3.

Table 1 tabulates the finite element results from nine foam-core samples and one control sample.

Example 1 (Control) comprises a paper core of thickness 152 microns, modulus 4129 MPa, and toughness 2640 kPa; ands polyolefin flanges of thickness 38 microns, modulus 4082 MPa, and toughness 51448 kPa. This structure is typical of a laminated photographic paper base described in the prior art.

Example 2 comprises a polyolefin foam core of thickness 76 microns, modulus 217 MPa, and toughness 25845 kPa; and polystyrene flanges of thickness 76 microns, modulus 2737 MPa, and toughness 2445 kPa.

Example 3 comprises a polyolefin foam core of thickness 114 microns, modulus 217 MPa, and toughness 25845 kPa; and paper flanges of thickness 57 microns, modulus 4129 MPa, and toughness 2640 kPa.

Example 4 comprises a polyolefin foam core of thickness 137 microns, modulus 217 MPa, and toughness 25845 kPa; and polyolefin flanges of thickness 46 microns, modulus 4082 MPa, and toughness 51448 kPa.

Example 5 comprises a polyolefin foam core of thickness 152 microns, modulus 217 MPa, and toughness 25845 kPa; and polyethylene naphthalate flanges of thickness 38 microns, modulus 6826 MPa, and toughness 102702 kPa.

Example 6 comprises a polypropylene foam core of thickness 76 microns, modulus 451 MPa, and toughness 381 kPa; and polystyrene flanges of thickness 76 microns, modulus 2737 MPa, and toughness 2445 kPa.

Example 7 comprises a polypropylene foam core of thickness 114 microns, modulus 451 MPa, and toughness 381 kPa; and paper flanges of thickness 57 microns, modulus 4129 MPa, and toughness 2640 kPa.

Example 8 comprises a polypropylene foam core of thickness 137 microns, modulus 451 MPa, and toughness 381 kpa; and polyolefin flanges of thickness 46 microns, modulus 4082 MPa, and toughness 51448 kPa.

Example 9 comprises a polypropylene foam core of thickness 152 microns, modulus 451 MPa, and toughness 381 kpa; and polyethylene naphthalate flanges of thickness 38 microns, modulus 6826 MPa, and toughness 102702 kPa.

In all cases, the modulus and toughness are obtained from the standard tensile test, ASTM D638.

TABLE 1

| Example # | Core Material | Modulus* (MPa) | Toughness* (kPa) | Thickness (microns) | Flange Material | Modulus* (MPa) | Toughness** (kPa) | Thickness (microns) | Results |
|---|---|---|---|---|---|---|---|---|---|
| 1 (Control) | Paper | 4130 | 2641 | 152 | Polyolefin | 4130 | 2640 | 38 | Unacceptabl |
| 2 | Polyethylene Foam | 214 | 27580 | 76 | Polystyrene | 2737 | 2445 | 76 | Acceptable |
| 3 | Polyethylene Foam | 214 | 27580 | 114 | Paper | 4129 | 2640 | 57 | Acceptable |
| 4 | Polyethylene Foam | 214 | 27580 | 137 | Polyolefin | 4082 | 51448 | 46 | Acceptable |
| 5 | Polyethylene Foam | 214 | 27580 | 152 | PEN | 6826 | 102702 | 38 | Acceptable |
| 7 | Polypropylene Foam | 448 | 379 | 76 | Polystyrene | 2737 | 2445 | 76 | Acceptable |
| 8 | Polypropylene Foam | 448 | 379 | 114 | Paper | 4129 | 2640 | 57 | Acceptable |
| 9 | Polypropylene Foam | 448 | 379 | 137 | Polyolefin | 4082 | 51448 | 46 | Acceptable |
| 10 | Polypropylene Foam | 448 | 379 | 152 | PEN | 6826 | 102702 | 38 | Acceptable |

*Tensile test (ASTM D638)

From the results shown above, the foam samples produce acceptable results for a wide range of foam and flange material and thickness combination.

Evaluation Using Guillotine Chopper

Figure 4:
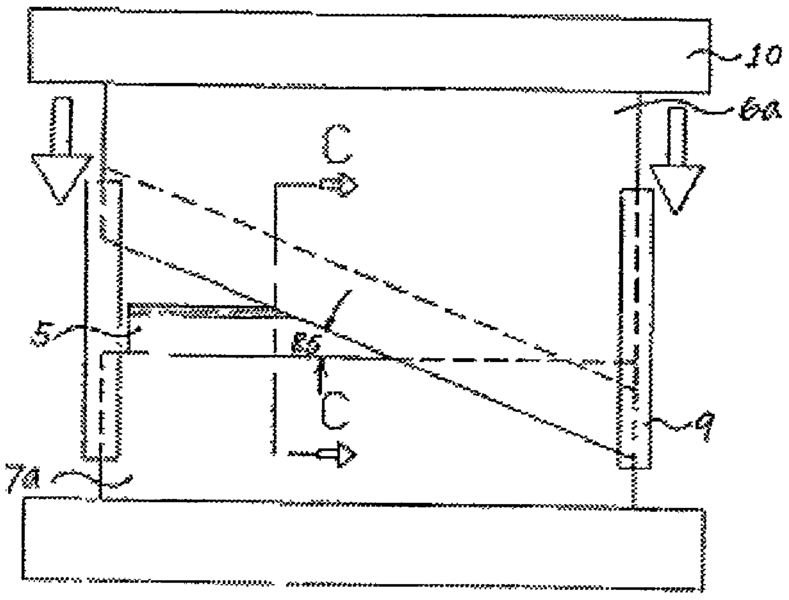
FIG. 4 is a schematic side view of a guillotine chopper.
Figure 5:
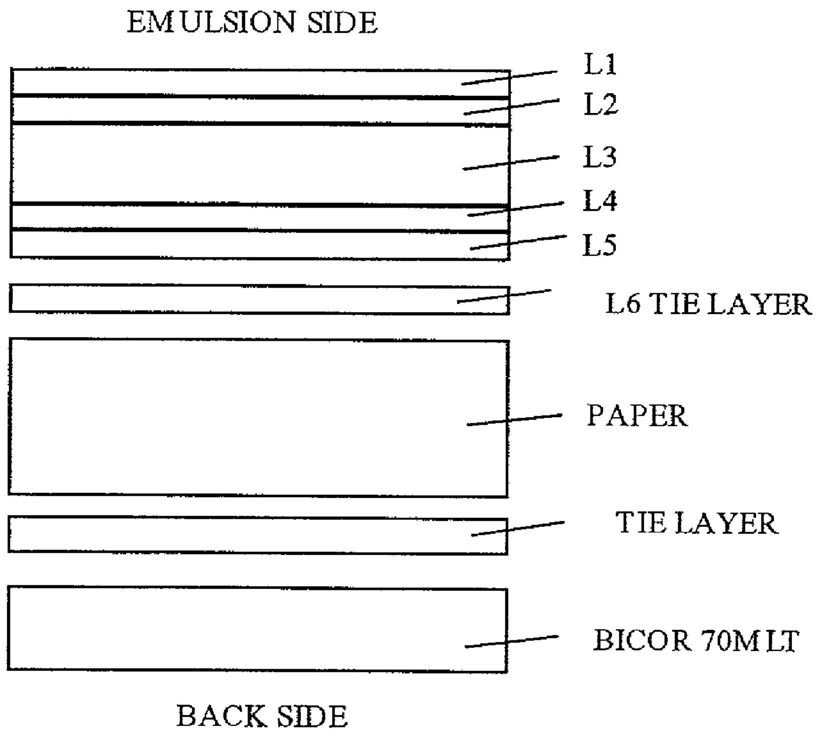
FIG. 5 is a layer structure diagram of a photographic paper in the prior art.

A guillotine chopper, shown in FIG. 4, was used in the experimental evaluation of nine samples. FIG. 4 is a schematic side view of a guillotine chopper in the prior art. 5 is the stationary knife. 6*a* is the moving knife. 9 is the knife guide. 7*a* is the stationary knife holder. 10 is the moving knife holder. 85 is the shear angle. The blades are made of CPM (crucible particle metal) stainless steel. The moving knife has a rake angle of sixty degrees; the stationary knife has a rake angle of zero degree; both have a relief angle of zero; the clearance between both knives is zero. Shear angle 85 is ten degrees. Chopping speed is 406 centimeter per second. Example 1 (Control) is representative of the prior art resin coated paper and is presented here for comparison purposes. FIG. 5 shows the layer structure of Example 11. It comprises a photographic paper raw base made using a standard fourdrinier paper machine utilizing a blend of mostly bleached hardwood Kraft fibers. The fiber ratio consisted primarily of bleached poplar (38%) and maple/beech (37%) with lesser amounts of birch (18%) and softwood (7%). Acid sizing chemical addenda, utilized on a dry weight basis, included an aluminum stearate size at 0.85% addition, polyaminoamide epichlorhydrin at 0.68% addition, and polyacrylamide resin at 0.24% addition. Titanium dioxide filler was used at 0.60% addition. Surface sizing using hydroxyethylated starch and sodium bicarbonate was also employed. Biaxially oriented polypropylene sheets were extrusion laminated to both sides of the above photographic grade cellulose paper support.

Bottom Sheet:

BICOR 70MLT (Mobil Chemical Co.)

This is a one-side matte finish, one-side treated polypropylene sheet (18 μm thick, d=0.9 g/cm$^3$) consisting of a solid oriented polypropylene core. This sheet was extrusion laminated to a photographic grade cellulose paper support with a clear polyolefin adhesive (22.5 g/m$^2$) with the matte finish side facing outside.

Top Sheet 36KF (Mobil Chemical Co.):

This is a composite sheet consisting of 5 layers identified as L1, L2, L3, L4, and L5. L1 is the layer on the outside. L6 indicates the extrusion coated adhesive layer used to laminate the top sheet to the paper support. A clear polyolefin adhesive (22.5 g/m$^2$) was used.

Table 1.1 below lists the characteristics of the layers L1–L5:

TABLE 1.1

| Layer | Material | Thickness, microns |
|---|---|---|
| L1 | LD Polyethylene with red and blue colorants | 0.762 |
| L2 | Polypropylene | 4.2 |
| L3 | Voided Polypropylene | 24.9 |
| L4 | Polypropylene | 4.32 |
| L5 | Polypropylene | 0.762 |

Example 12 of the Invention comprises a foamed polypropylene (Now 8024) 110 μm thick and has a basis weight of 61.0. This foam which has been corona treated was melt extrusion laminated on each side with a photographic paper base using an ethylene methylacrylate tie layer, specifically an Equistar grade 806-009. The tie layer coverage was approximately 12.2. The paper raw base used here was also made using a standard fourdrinier paper machine utilizing a similar blend of mostly bleached hardwood Kraft fibers with similar chemistry to sample 1 above. It had a caliper of 0.05 mm and a basis weight of 48 g/m$^2$.

Example 13 of the Invention comprises a foamed polypropylene (Berwick 500) 110 μm thick and has a basis weight of 61.0 g/m$^2$. This foam which has been corona treated was melt extrusion laminated on each side with an oriented polystyrene sheet which was 57.15 μm thick, having a density of 1.05 g/cm$^3$ and has a flexural modulus in the range of 2585–3070 megaPascal. An ethylene methylacrylate (EMA) tie layer, specifically an Equistar grade 806-009, was used to accomplish the lamination. The tie layer coverage was approximately 12.2 g/m$^2$.

The results of chopping are shown in Table 2. Samples with much debris hanging on the cut edge are considered unacceptable, while samples with little debris are considered acceptable.

TABLE 2

| Example # | Core | Flange | Total Thickness (mm) | Result |
|---|---|---|---|---|
| 11 (Control) | paper | polyolefin | 0.229 | unacceptable |
| 12 | Now 8024 | paper | 0.250 | acceptable |
| 13 | Berwick 500 | Oriented Polystyrene | 0.251 | acceptable |

As is apparent from the results shown in the above table, the samples with the foam material as core layer exhibit very little debris and display acceptable cutting performance, while the Example 11 (control) is considered unacceptable because of the relatively large amount of debris during cutting.

The invention has been described in detail with particular reference to certain preferred embodiments thereof, but it will be understood that variations and modifications can be effected within the spirit and scope of the invention.

What is claimed is:

1. An imaging member comprising an imaging layer and a base wherein said base comprises a thermoplastic polymer closed cell foam core sheet, wherein said foam core sheet has a topside and a bottom side, wherein said topside of said foam core sheet is adhered to an upper sheet, and said bottom side of said foam core sheet is adhered to a lower sheet, wherein said foam core sheet has a modulus of between 100 and 2758 MPa and a tensile toughness between 0.344 and 35 MPa, and wherein each of said upper and lower sheets has a modulus of between 1380 and 20000 MPa and a toughness between 1.4 and 210 MPa wherein each of said upper and lower sheets is selected from at least one member of the group consisting of paper, polyolefins, and polystyrene.

2. The imaging member of claim 1 wherein a polyolefin is selected and comprises an oriented polyolefin.

3. The imaging member of claim 1 wherein said thermoplastic polymer foam core sheet comprises a polymer selected from the group consisting of polyolefin, polystyrene, polyvinylchloride and polyurethane.

4. An imaging member of claim 1 wherein said imaging member further comprises an ink jet receiving layer.

5. An imaging member of claim 1 wherein said upper sheet has thickness of between 10 and 150 micrometers.

6. An imaging member of claim 1 wherein said foam core sheet has thickness of between 25 and 350 micrometers.

7. An imaging member of claim 1 wherein the ratio of thickness between said foam core sheet and said upper sheet is between 0.1 and 10.

8. An imaging member of claim 1 wherein said foam core sheet comprises polyolefin.

9. An imaging member of claim 1 wherein said base has a thickness of between 100 and 400 micrometers.

10. An imaging member of claim 1 wherein said upper and lower sheets are integral with said foam core sheet.

11. An imaging member of claim 1 wherein said imaging member further comprises at least one photosensitive layer silver halide emulsion.

* * * * *